(12) United States Patent
Lavielle-Barret et al.

(10) Patent No.: US 12,718,699 B2
(45) Date of Patent: Aug. 25, 2026

(54) METHOD AND SYSTEM USING A NEURAL NETWORK TO PREDICT A TIME OF OCCUPANCY OF A RUNWAY BY AN AIRCRAFT

(71) Applicants: Airbus SAS, Blagnac (FR); Airbus Operations SAS, Toulouse (FR)

(72) Inventors: Isabelle Lavielle-Barret, Toulouse (FR); Olivier Chauvet, Blagnac (FR); Alexandre Quentin, Blagnac (FR); Romain Mabille, Toulouse (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 13 days.

(21) Appl. No.: 18/906,473

(22) Filed: Oct. 4, 2024

(65) Prior Publication Data

US 2025/0131835 A1 Apr. 24, 2025

(30) Foreign Application Priority Data

Oct. 19, 2023 (FR) ...................................... 2311318

(51) Int. Cl.
*G08G 5/51* (2025.01)
*G06N 3/08* (2023.01)
*G08G 5/72* (2025.01)

(52) U.S. Cl.
CPC ................ *G08G 5/51* (2025.01); *G06N 3/08* (2013.01); *G08G 5/727* (2025.01)

(58) Field of Classification Search
None
See application file for complete search history.

(56) References Cited

U.S. PATENT DOCUMENTS

| | | | | |
|---|---|---|---|---|
| 6,463,383 | B1 * | 10/2002 | Baiada | G08G 5/727 342/36 |
| 7,702,427 | B1 * | 4/2010 | Sridhar | G08G 5/80 701/16 |
| 10,290,217 | B1 * | 5/2019 | Ramachandra | G08G 5/76 |

(Continued)

FOREIGN PATENT DOCUMENTS

| | | | |
|---|---|---|---|
| EP | 4012686 | A1 | 6/2022 |
| FR | 1909228 | A1 | 2/2021 |
| FR | 3099962 | A1 | 2/2021 |

OTHER PUBLICATIONS

French Search Report for corresponding French Patent Application No. 2311318 dated May 30, 2024.

*Primary Examiner* — Daniel L Greene
*Assistant Examiner* — Robert L Pinkerton
(74) *Attorney, Agent, or Firm* — Greer, Burns & Crain, Ltd.

(57) ABSTRACT

A prediction system with a unit for generating a current value of a parameter relating to the movement of an aircraft, a selection unit for a crew member of the aircraft to select an exit of the runway used for landing, an avionics computer for computing a value of the time of occupancy of the runway and a unit for transmitting this value to a user system. The avionics computer using an initial ground speed and an exit type and an exit distance of the exit selected, and computes the value of the time of occupancy of the runway, with the data and by using a prediction model comprising a neural network trained on the basis of landing data originating from previous landings.

18 Claims, 3 Drawing Sheets

(56) References Cited

U.S. PATENT DOCUMENTS

| | | | | |
|---|---|---|---|---|
| 2015/0120098 | A1* | 4/2015 | Catalfamo | G08G 5/54 701/16 |
| 2017/0183086 | A1* | 6/2017 | Le-Bouedec | G08G 5/54 |
| 2021/0020056 | A1 | 1/2021 | Chenchu et al. | |
| 2021/0043097 | A1* | 2/2021 | Gaertner | G05B 23/0283 |
| 2022/0139232 | A1* | 5/2022 | Lopez Leones | G08G 5/21 340/971 |
| 2022/0198703 | A1 | 6/2022 | Evans et al. | |
| 2022/0215760 | A1* | 7/2022 | Jorgensen | G08G 5/56 |
| 2022/0335837 | A1* | 10/2022 | Agyekum | G08G 5/30 |

* cited by examiner

METHOD AND SYSTEM USING A NEURAL NETWORK TO PREDICT A TIME OF OCCUPANCY OF A RUNWAY BY AN AIRCRAFT

CROSS-REFERENCES TO RELATED APPLICATIONS

This application claims the benefit of French Patent Application Number 2311318 filed on Oct. 19, 2023, the entire disclosure of which is incorporated herein by way of reference.

FIELD OF THE INVENTION

The present invention relates to a system and a method for predicting a time of occupancy of a runway by an aircraft. It also relates to an aircraft equipped with such a system for predicting the time of occupancy of a runway.

BACKGROUND OF THE INVENTION

Generally, the management of air traffic and of the capacity of an aerodrome depends on the way in which the runways which make it possible for aircraft, in particular transport airplanes, to land and take off are used. For optimal and secure use of these runways, it is necessary to adhere to minimum separation distances, notably between the arrival of two successive aircraft or between the arrival and the departure of two successive aircraft on the same runway of the aerodrome.

This separation distance is determined in accordance, among other things, with the time of occupancy of a runway of each of the aircraft.

The time of occupancy of a runway may be predicted on the ground, by air traffic control systems. The time of occupancy of a runway is then estimated on the basis of statistical data of occupancy of each runway in accordance with types of aircraft, weather conditions, etc. However, since this determination, on the ground, of the time of occupancy does not depend on data of current parameters of the aircraft, it is necessary to take into account additional margins in the separations between arrivals, departures or arrival and departure, in order to mitigate the uncertainty about the behavior of the aircraft (for example, exit taxiway anticipated by the pilot).

In order to remedy this drawback, the document FR-1909228 provides a system for predicting the time of occupancy of a runway by an aircraft, which uses, for prediction, current parameters of the aircraft in the landing phase or in the takeoff phase. The time of occupancy of a runway is transmitted directly to air traffic control, which may, in return, adjust the separations between two arrivals, two departures, or an arrival and a departure of aircraft on the same runway.

However, this advantageous solution implements numerous computations and requires a relatively high computing capacity.

There is therefore a need to find a solution which makes it possible to predict a time of occupancy of a runway by an aircraft, with a need for computing capacity and a computing time which are reduced.

SUMMARY OF THE INVENTION

The present invention relates to a method for predicting a time of occupancy of a runway of an aerodrome by an aircraft when the aircraft lands, which makes it possible to provide a solution to meet the aforementioned need.

According to the invention, said method comprising at least the sequence of the following steps:

- a generation step, implemented by a generation unit, for generating at least one current value of a parameter relating to the movement of the aircraft;
- a data processing step, implemented by an avionics computer, at least for computing a value of the time of occupancy of the runway; and
- a transmission step, implemented by a transmission unit, for transmitting at least said value of the time of occupancy of the runway to a user system, is noteworthy in that it comprises a selection step, implemented by a selection unit, for making it possible for a crew member of the aircraft at least to select an exit from the runway used for landing, said exit being characterized by an exit type and an exit distance, and in that, in the data processing step, the avionics computer uses at least the following data: an initial ground speed generated in the generation step and an exit type and an exit distance of the exit selected in the selection step, and it computes, with the aid of these data, using a prediction model comprising a neural network trained on the basis of landing data originating from previous landings, said value of the time of occupancy of the runway.

This method thus uses many fewer parameters than the aforementioned usual solution to compute the value of the time of occupancy of the runway, and does so while implementing simplified computation by virtue of using a neural network, this making it possible to use fewer computing resources for prediction and to reduce the computing time.

Advantageously, in the data processing step, the avionics computer also uses a braking mode selected for an automatic braking system of the aircraft, to compute the value of the time of occupancy of the runway.

In one particular embodiment, in the data processing step, the avionics computer generates an occupancy rate comprising at least some of the following information:

- the value of the time of occupancy of the runway, as computed in the data processing step;
- a confidence indication for said value of the time of occupancy of the runway;
- the runway of the aerodrome used for landing; and
- the exit from said runway as selected in the selection step.

In this particular embodiment, advantageously, in the transmission step, the occupancy rate generated in the data processing step is transmitted to an air traffic control system of the aerodrome in at least one of the following situations:

- on the request of the air traffic control system;
- in the event that the value of the time of occupancy of the runway, as computed, is greater than a given threshold value; and
- in the event of a change of exit from the runway.

Moreover, advantageously, the data processing step comprises a registration substep for registering the value of the time of occupancy of the runway, as computed.

Furthermore, advantageously, the method comprises a preliminary training step, for, before said sequence of steps, training the prediction model on the basis of landing data originating from previous landings and corresponding values of time of occupancy of the runway, said prediction model being integrated into the avionics computer.

The present invention also relates to a system for predicting a time of occupancy of a runway of an aerodrome by an aircraft when the aircraft lands, said system comprising at least:

- a generation unit configured to generate at least one current value of a parameter relating to the movement of the aircraft;
- an avionics computer configured at least to compute a value of the time of occupancy of the runway; and
- a transmission unit configured to transmit at least said value of the time of occupancy of the runway to a user system.

According to the invention, said system comprises, in addition, a selection unit configured to make it possible for a crew member of the aircraft at least to select an exit from the runway used for landing, said exit being characterized by an exit type and an exit distance, and the avionics computer uses the following data: an initial ground speed generated by the generation unit and an exit type and an exit distance of the exit selected with the aid of the selection unit, and it is configured to compute, with the aid of these data, using a prediction model comprising a neural network trained on the basis of landing data originating from previous landings, said value of the time of occupancy of the runway.

In one particular embodiment, the selection unit corresponds to at least one of the following human-machine interfaces:

- a human-machine interface of an electronic flight bag;
- a human-machine interface of a flight management system of the aircraft.

In addition, advantageously, the computing unit forms part of one of the following systems of the aircraft:

- a flight management system;
- an air traffic service unit.

The present invention moreover relates to an aircraft, in particular a transport airplane, which is equipped with a system for predicting a time of occupancy of a runway, such as that described above.

BRIEF DESCRIPTION OF THE DRAWINGS

The appended figures will make it easy to understand how the invention may be implemented. In these figures, identical reference signs denote similar elements.

DETAILED DESCRIPTION OF THE PREFERRED EMBODIMENTS

The system for predicting the time of occupancy of a runway ("prediction system" 1 below) which makes it possible to illustrate the invention is depicted schematically, in one particular embodiment, in FIG. 1. This prediction system 1 is intended to predict the time which an aircraft AC, in particular a transport airplane, will occupy on a runway R of an aerodrome 2 depicted partially in FIG. 2, when it lands on this runway R.

Figure 2:
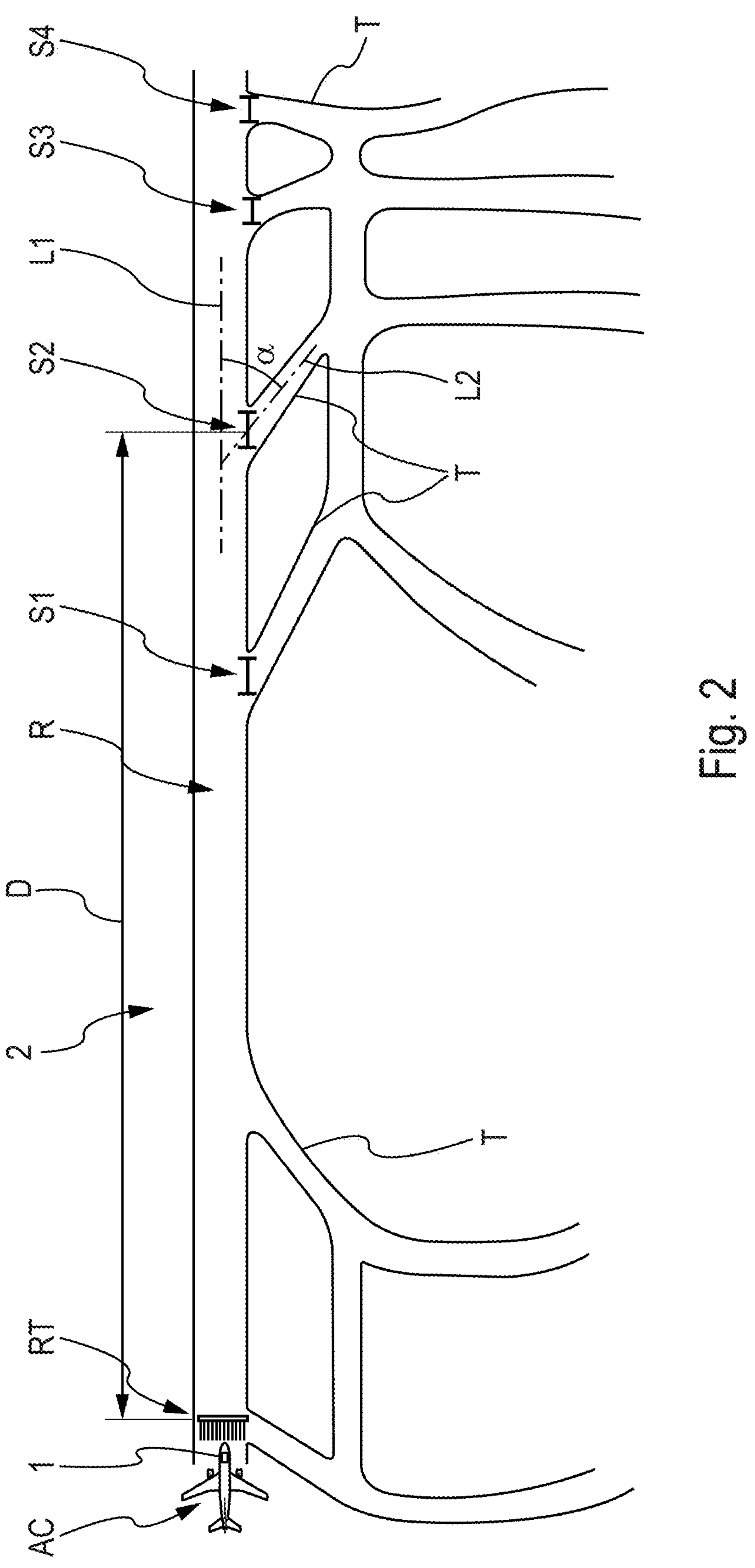
FIG. 2 depicts a plan view of a portion of an aerodrome, provided with a runway, used for the landing of an aircraft equipped with a system for predicting a time of occupancy of a runway.

As depicted very schematically in FIG. 2, this prediction system 1 is mounted on the aircraft AC, and it predicts the runway occupancy time (ROT) when the aircraft AC is preparing to land.

In the context of the present invention, what is meant by "runway" R is the surface of the aerodrome 2 on which the aircraft AC may land (or take off). Each runway R of the aerodrome 2 comprises exits (or entries), as depicted in FIG. 2 for exits S1, S2, S3 and S4, which are liable to be used upon landing. The aerodrome also comprises taxiways T, notably at these exits S1, S2, S3 and S4, which make it possible for the aircraft AC to move from the runway R to a hardstand (which is not depicted) of the aerodrome 2, after it lands.

In addition, the time of occupancy of the runway which is determined by the prediction system 1 may represent the sum of an approach time and of a taxi time of the aircraft AC.

The approach time corresponds to the flight time of the aircraft AC between the position of the aircraft AC when it passes over the threshold RT of the runway R at a height of around 15 meters above the ground and a position of the aircraft AC in which the wheels of its landing gear make contact with the ground of the runway. With regard to the taxi time, it corresponds to the time during which the aircraft AC is taxiing on the runway R between the position in which the wheels of the aircraft AC touch the ground of the runway R and the position of the aircraft AC at the exit from the runway, that is to say in the position in which the runway R is considered to be free and therefore usable for another landing or a takeoff.

In the following description, with reference to the example of FIG. 2, it is considered that the aircraft will leave the runway R (notably provided with the exits S1, S2, S3 and S4) at the exit S2.

The time of occupancy of the runway, upon landing, therefore corresponds to the time between the position of the aircraft AC when it passes over the threshold RT and the position of the aircraft AC at its exit from the runway R.

Figure 1:
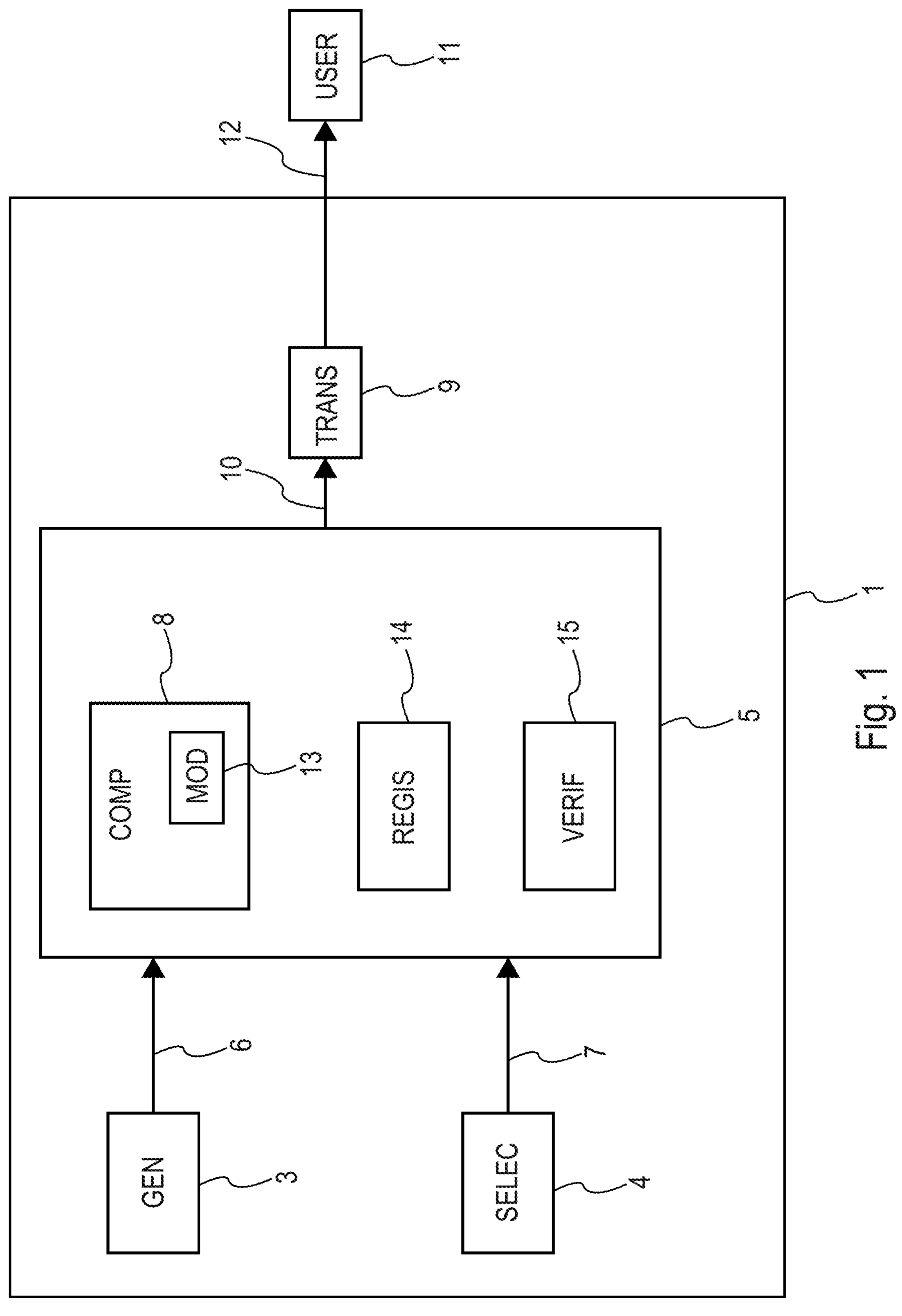
FIG. 1 is a block diagram of a system for predicting a time of occupancy of a runway illustrating one embodiment of the invention.

In one preferred embodiment, depicted in FIG. 1, the prediction system 1 comprises:

- a generation unit 3 (GEN) for generating at least one current value of a parameter relating to the movement of the aircraft AC;
- a selection unit 4 (SELEC) configured to make it possible for a crew member of the aircraft AC at least to select an exit from the runway R used for landing, namely the exit S2 in the example of FIG. 2;
- an avionics computer 5 connected, via links 6 and 7, respectively, to the generation unit 3 and the selection unit 4, the avionics computer 5 comprising a computation unit 8 (COMP) configured at least to compute a value of the time of occupancy of the runway; and
- a transmission unit 9 (TRANS) connected, via a link 10, to the avionics computer 5 and configured to transmit, to a user system 11 (USER) via a link 12, said value determined by the computation unit 8 for computing the time of occupancy of the runway.

For this purpose, the avionics computer 5 receives at least the following data, specified below:

- an initial ground speed normally generated by the generation unit 3. This initial ground speed represents the speed of the aircraft AC when it touches the ground upon landing on the runway R and it corresponds to a final approach speed, determined normally; and
- the exit type and the exit distance, which are specified below, of the exit S2 (of the runway R) which was selected by a crew member with the aid of the selection unit 4. Each exit S1, S2, S3, S4 of the runway R which is liable to be taken by the aircraft AC is characterized by an exit type and an exit distance.

In addition, the computation unit 8 of the avionics computer 5 determines, with the aid of at least the aforementioned data which the avionics computer 5 received, the value of the time of occupancy of the runway. For this purpose, the computation unit 8 uses a prediction model 13 (MOD) integrated, preferably, into the computation unit 8. This prediction model 13 comprises a neural network, which was trained on the basis of landing data originating from previous landings and flights, as specified below.

In one preferred embodiment, the generation unit 3 generates the initial ground speed of the aircraft AC, normally, on the basis of the current values of the following parameters:

the approach speed of the aircraft AC;

the wind speed and direction at the aerodrome 2;

the altitude of the aerodrome 2; and the temperature at the aerodrome 2.

In a first particular embodiment, the selection unit 4 used by a pilot, notably to select the exit S2 of the runway R which they anticipate taking, corresponds to a human-machine interface of an electronic flight bag (EFB).

Furthermore, in a second particular embodiment, the selection unit 4 corresponds to a human-machine interface, of MCDU (multi-control display unit) type, of a flight management system (FMS).

Moreover, in the context of the present invention, the avionics computer 5 may correspond to various computers or computing systems which are present on the aircraft AC.

In a first particular embodiment, the avionics computer 5 forms part of a flight management system.

Furthermore, in a second particular embodiment, the avionics computer 5 forms part of an air traffic service unit (ATSU).

Moreover, as depicted in FIG. 1, in one preferred embodiment, the prediction system 1 comprises a registration unit 14 (REGIS) integrated, for example, into the avionics computer 5. This registration unit 14 is intended to register the value of the time of occupancy of the runway, computed by the computation unit 8. This value thus registered may subsequently be transmitted to a user system, such as the user system 11, for example via the transmission unit 9.

As depicted in FIG. 1, the avionics computer 5 comprises, in addition, a verification module 15 (VERIF). This verification module 15 is able to compare the value of the time of occupancy of a runway determined by the computation unit 8 with a predetermined threshold value of the time of occupancy of the runway R which is, for example, registered in the computation unit 8 or in a memory of the prediction system 1. The verification module 15 is also able to generate alert information (which is transmitted to the user system 11) if the predicted value of the time of occupancy of the runway is greater than this threshold value. The threshold value may represent a maximum time of occupancy of the runway R which it is necessary to adhere to in order to ensure the safety of the separation between aircraft, namely between two arrivals or between a departure and an arrival on the same runway R.

The user system 11 may be an air traffic control system (for example, a storage unit, a data processing unit, etc.) used, by an air traffic controller, in the context of air traffic control on the approach and on the aerodrome. The user system 11 may comprise, for example, a display screen which makes it possible for an operator, for example an air traffic controller, to view the time of occupancy of the aircraft AC on the runway R.

Moreover, the link 12 between the avionics computer 5 on board the aircraft AC and the user system 1 is, preferably, a normal data transmission link, notably an ADS-C (automatic dependent surveillance-contract) data transmission link.

The prediction system 1, as described above, may be inserted into existing avionics computers and systems and it thus has a reduced cost.

Figure 3:
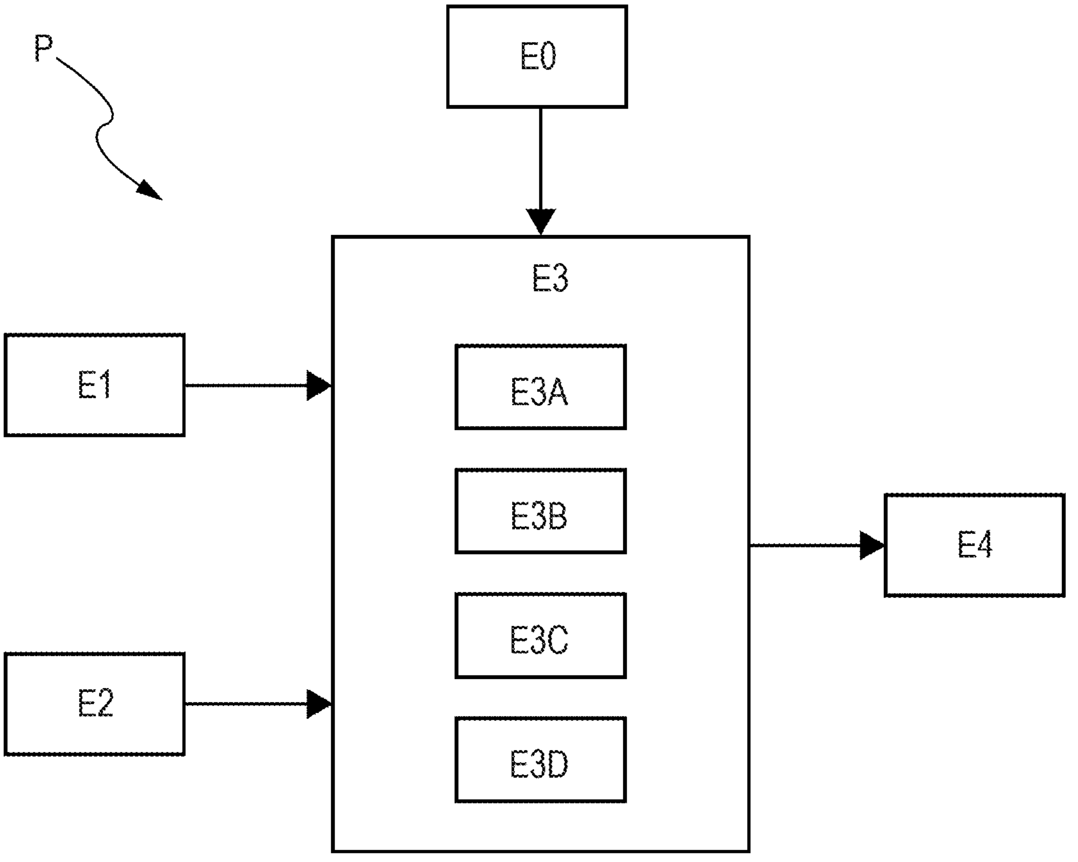
FIG. 3 schematically illustrates a method for predicting a time of occupancy of a runway.

Said prediction system 1 implements a method P for predicting a time of occupancy of a runway, as depicted in FIG. 3. The method P comprises at least the sequence of the following steps:

a generation step E1, implemented by the generation unit 3, for generating at least one current value of a parameter relating to the movement of the aircraft AC;

a selection step E2, implemented by the selection unit 4, for making it possible for a crew member of the aircraft AC to select at least one exit S2 of the runway R used for landing;

a data processing step E3 which comprises a computing substep E3A, implemented by the computation unit 8 of the avionics computer 5, for computing at least one value of the time of occupancy of the runway, the computing substep E3A using, for this purpose, an initial ground speed generated in the generation step E1 and an exit type and an exit distance of the exit S2 selected in the selection step E2; and a transmission step E4, implemented by the transmission unit 9, for transmitting at least said value of the time of occupancy of the runway to the user system 11.

The steps of the method P are described in more detail below.

In one preferred embodiment, in the generation step E1, the generation unit 3 generates the initial ground speed of the aircraft AC normally. Preferably, the generation unit 3 may generate this initial ground speed taking into account the current values (which are available on the aircraft AC) of the following parameters, which may have an influence on this ground speed:

the approach speed of the aircraft AC;

the wind speed and direction at the aerodrome 2;

the altitude of the aerodrome 2; and the temperature at the aerodrome 2.

In the computing substep E3A of the data processing step E3, the computing unit 8 uses, to compute the value of the time of occupancy of the runway, in addition to the initial ground speed generated in the generation step E1, the exit type and the exit distance of the exit selected in the selection step E2, namely the exit S2 of the runway R in the example of FIG. 2.

In relation to the exit type, in the context of the present invention, various exit types may be envisaged. Preferably, the exit type depends on the speed at which the aircraft AC exits the runway R at the corresponding exit S2.

In one preferred embodiment, two exit types are considered. These types depend on the value of an angle $\alpha$ between the direction L1 of the runway R and the direction L2 of the exit under consideration for leaving the runway R, as depicted for the exit S2 in FIG. 2. A first type corresponds to an angle $\alpha$ which is less than a predetermined value $\alpha 0$ and represents an exit which the aircraft AC may take at a high speed, for example at a taxi speed of the order of 75 to 90 kilometers per hour, and the second type corresponds to an angle $\alpha$ which is greater than or equal to this predetermined value $\alpha 0$ and represents an exit which the aircraft AC must take at a lower speed. In one particular embodiment, the predetermined value $\alpha 0$ is equal to 45°.

Moreover, the exit distance D corresponds to the distance between the threshold RT of the runway and the selected exit, as depicted for the exit S2 in FIG. 2.

The selection step E2 and the transmission of the information relating to the selected exit S2, namely, on the one hand, the exit distance D between the threshold RT of the runway and the exit S2 (along the runway R) and, on the other hand, the exit type, may be implemented in various ways.

In a first embodiment, in the selection step E2, the pilot, in addition to selecting the exit S2 of the runway R, enters both the exit distance and the exit type in relation to this exit S2 into the prediction system 1 and notably into the avionics computer 5 with the aid of the selection unit 4.

In a second embodiment, in the selection step E2, the pilot selects only the exit S2 (which will be used to exit the runway R) with the aid of the selection unit 4.

In a first particular embodiment of this second embodiment, this selection is made by entering the name of the exit with the aid of the selection unit 4.

In a second particular embodiment of this second embodiment, the selection unit 4 comprises a display device which displays a map, at least the runway R with its exits S1 to S4, and the pilot selects the exit directly on the map, for example by moving a cursor there and by confirming the position with the aid of a normal computing means such as a numeric keypad or a touch interface, for example.

In this second embodiment, the selection unit 4 is configured to automatically provide the exit distance and the exit type which correspond to those of the exit S2 selected by the pilot.

In the computing substep E3A of the data processing step E3, the computation unit 8 of the avionics computer 5 therefore uses the following data:

- an initial ground speed (corresponding to the speed of the aircraft when it touches the ground, which is equal to a final approach speed) generated by the generation unit 3; and
- the exit type and the exit distance of the exit S2 (of the runway R) selected with the aid of the selection unit 4.

In one particular embodiment, in the computing substep E3A, the computation unit 8 of the avionics computer 5 also uses a braking mode selected for a normal autobrake or brake-to-vacate automatic braking system of the aircraft, to compute the value of the time of occupancy of the runway. In this particular embodiment, the method P therefore takes into account the deceleration capacities of the aircraft.

Consequently, the computing substep E3A of the method P uses only the values of a few parameters, that is to say many fewer parameters than the aforementioned normal solution, for prediction, this making it possible to use fewer computing resources (of the avionics computer 5) and to reduce the computing time.

The computation unit 8 determines, with the aid of these few parameters, said value of the time of occupancy of the runway, using for this purpose the prediction model 13 comprising a neural network specified below.

Thus, the method P implements simplified computation by virtue of using this neural network, this also contributing to reducing the computing resources which are necessary for prediction and to reducing the computing time.

In one particular embodiment, the data processing step E3 also comprises a rate generation substep E3B, in which the computation unit 8 of the avionics computer 5 generates an occupancy rate. This occupancy rate comprises at least some (and preferably all) of the following information:

- the value of the time of occupancy of the runway R, as computed in the computing substep E3A;
- a confidence indication for said value of the time of occupancy of the runway;
- the runway R of the aerodrome 2 used for landing;
- the exit S2 from said runway R as selected in the selection step E2.

The confidence indication for said value of the time of occupancy of the runway depends on the accuracy of computation. This confidence indication may, notably, be expressed in a unit of time (for example, in seconds) and correspond to the maximum error time of the value (of the time of occupancy of the runway) computed by the computation unit 8.

The point of this confidence indication, for an air traffic controller, is to know what level of confidence they may have in the value of the time of occupancy of the runway received so as to make it possible for them to optimize the minimum separation from the following aircraft which will use the same runway (for landing or takeoff). This also provides an indication to the air traffic controller to make it possible for them to estimate the level of attention which they must pay to the aircraft AC when it lands.

In this particular embodiment, the occupancy rate generated in the rate generation substep E3B is preferably also transmitted, in the transmission step E4, to a user system (such as the user system 1) and notably to an air traffic control system of the aerodrome. The value of the time of occupancy of the runway or this occupancy rate may be transmitted to the air traffic control system around 30 minutes before landing, this making it possible for an air traffic controller to adjust the separations if necessary.

In one preferred implementation of this particular embodiment, the occupancy rate is transmitted to the air traffic control system of the aerodrome in at least one of the following situations:

- on the request of the air traffic control system;
- in the event that the value of the time of occupancy of the runway, as computed, is greater than a given threshold value; and
- in the event of a change of exit from the runway.

Preferably, the occupancy rate is transmitted each time that one of these situations arises.

Transmitting the value of the time of occupancy of the runway by an aircraft AC to an air traffic controller makes it possible for the latter to adjust the separation of the aircraft between the arrival of two successive aircraft or between the arrival and the departure of two successive aircraft on the same runway R of the aerodrome 2.

The data processing step E3 of the method P also comprises a registration substep E3C for registering the value of the time of occupancy of the runway, computed in the computing substep E3A. The value thus registered may subsequently be transmitted to the user system 1 and may, for example, be used for future refinement of the prediction model.

Moreover, the data processing step E3 of the method P also comprises a verification substep E3D.

During this verification substep E3D, the verification unit 15 compares the predetermined threshold value of the time of occupancy of a runway with the value of the time of occupancy of the runway computed by the computation unit 8. If this latter value is greater than the threshold value, the verification unit 15 may transmit alert information relating to this comparison result, which may be transmitted to a user system, and notably to an air traffic control system. This information makes it possible for an air traffic controller, for example, to adjust the separations between two arrivals. Preferably, if the computed value is less than or equal to the threshold value, the verification unit 15 does not transmit any information.

This predetermined threshold value may represent a limiting value which the value of the time of occupancy of a runway, computed by the computation unit 8, must not exceed. This may be a value of the time of occupancy of a runway determined by the user system 1 and comprising error margins notably depending on the confidence indicator.

Moreover, the method P also comprises a preliminary training step E0. This preliminary training step E0 is carried out before the sequence of steps E1, E2, E3 and E4 is implemented and its object is to define the prediction model 13 used in the data processing step E3.

This preliminary training step E0 implements training (of the machine learning type, with a training set) of the prediction model on the basis of landing data originating from previous landings and corresponding values of time of occupancy of the runway, said prediction model 13 being integrated into the avionics computer 5.

The prediction model is based on a neural network. In one preferred embodiment, this neural network is trained on the basis of landing data registered during several thousand landings which were actually carried out. Such a volume of landing data (which are obtained, in addition, on the basis of actual situations) makes it possible to obtain a particularly accurate prediction model.

The landing data which form the training set preferably comprise, for each landing taken into account, the values of the input data used by the computation unit 8, namely mainly the initial ground speed, the exit type and the exit distance, as well as the corresponding value of the time of occupancy of the runway.

In addition, the prediction system 1 is tested, in actual conditions, in order to generate the confidence indication which is associated with the prediction of the time. This makes it possible to provide accurate information which makes it possible for the air traffic controller to optimize the minimum separation from the following aircraft which uses the same runway.

The prediction system 1 on board the aircraft AC is therefore intended to provide assistance with the landing of the aircraft AC. By way of illustration, one example of a landing procedure for the aircraft AC provided with the prediction system 1 may comprise the following steps:

- the aircraft AC, on the approach to the aerodrome 2, declares itself able to determine the time of occupancy of the runway with the aid of the onboard prediction system 1;
- air traffic control establishes contact with the aircraft AC, via a data transmission link, and indicates to it the runway R to use;
- the crew of the aircraft AC prepares for the descent and selects an exit S2 of the runway R which will be used for landing;
- the prediction system 1 determines the time of occupancy of the runway and establishes an occupancy rate;
- the prediction system 1 sends the occupancy rate to air traffic control with the aid of the transmission unit 9;
- air traffic control uses this occupancy rate to define the separation on the final approach;
- the aircraft AC lands on the runway R and leaves this runway R (after landing) by the selected exit S2.

The prediction system 1 and the method P as described above have numerous advantages. In particular, the prediction which they carry out:

- may be implemented by existing systems, notably by an avionics computer;
- uses few parameters, and notably many fewer parameters than the normal solutions, to compute the value of the time of occupancy of the runway;
- makes it possible to provide an accurate result, by virtue of the training carried out on the basis of actual landing data in order to generate the prediction model and by virtue of the communication of a confidence indicator;
- implements simplified computation by virtue of using a neural network;
- thus uses fewer computing resources for prediction than the normal solutions; and
- thus has a reduced computing time.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for predicting a time of occupancy of a runway of an aerodrome by an aircraft when the aircraft lands, said method comprising a sequence of the following steps:

a generation step, implemented by a generation unit, for generating at least one current value of a parameter relating to a movement of an aircraft;

a selection step, implemented by a selection unit, for allowing a crew member of the aircraft to select an exit from the runway used for landing, said exit having an exit type and an exit distance;

a data processing step, implemented by an avionics computer, for computing a value of a time of occupancy of the runway, wherein the avionics computer, to compute said value of the time of occupancy of the runway:

utilizes at least one data from: an initial ground speed generated in the generation step, and the exit type and the exit distance of the exit selected in the selection step; and implements a prediction model comprising a neural network trained on landing data originating from previous landings;

a comparison step, implemented by the avionics computer, of comparing the computed value of the time of occupancy of the runway with a threshold;

a transmission step, implemented by a transmission unit, for transmitting at least said value of the time of occupancy of the runway to a user system; and an execution step, implemented by the user system, of executing an avoidance task on at least one of the aircraft or a subsequent aircraft when the time of occupancy of the runway exceeds the threshold as determined in the comparison step.

2. The method as claimed in claim 1, wherein, in the data processing step, the avionics computer further utilizes a braking mode selected for an automatic braking system of the aircraft, to compute said value of the time of occupancy of the runway.

3. The method as claimed in claim 1, wherein the data processing step comprises a registration substep for registering the value of the time of occupancy of the runway, as computed.

4. The method as claimed in claim 1, further comprising:

a preliminary training step, for, before said sequence of steps, training the prediction model based on landing data originating from previous landings and corresponding values of time of occupancy of the runway, said prediction model being integrated into the avionics computer.

5. The method as claimed in claim 1, wherein the avoidance task is selected from at least one of the following:

a go-around procedure;

a hold short;

a reduction or increase of airspeed; or a heading or altitude change.

6. The method as claimed in claim 1, wherein, in the data processing step, the avionics computer generates an occupancy rate comprising at least one information from:

the value of the time of occupancy of the runway, as computed in the data processing step;

a confidence indication for said value of the time of occupancy of the runway;

the runway of the aerodrome used for landing; and the exit from said runway as selected in the selection step.

7. The method as claimed in claim 6, wherein, in the transmission step, the occupancy rate generated in the data processing step is transmitted by the transmission unit to an air traffic control system of an aerodrome for at least one situation from:

a request of the air traffic control system;

when the value of the time of occupancy of the runway, as computed, is greater than a given threshold value; and when there is a change of exit from the runway.

8. The method as claimed in claim 1, wherein the computing of the value of the time of occupancy of the runway is based on a sum of an approach time and a taxi time.

9. The method as claimed in claim 8, wherein the approach time is determined based on a flight time of the aircraft when the aircraft passes over a runway threshold at a height of 15 meters above the ground to when wheels of the aircraft make contact with the ground.

10. The method as claimed in claim 8, wherein the taxi time is determined based on a time taken by the aircraft when wheels of the aircraft make contact with the ground to when the aircraft exits the runway.

11. A system for predicting a time of occupancy of a runway of an aerodrome by an aircraft when the aircraft lands, said system comprising:

a generation unit configured to generate at least one current value of a parameter relating to a movement of a aircraft;

a selection unit configured to allow a crew member of the aircraft to select an exit from the runway used for landing, the exit comprising an exit type and an exit distance;

an avionics computer configured to compute a value of a time of occupancy of the runway and to compare the computed value of the time of occupancy of the runway with a threshold, wherein the avionics computer, to compute said value of the time of occupancy of the runway:

utilizes at least one data from: an initial ground speed generated in the generation step, and the exit type and the exit distance of the exit selected in the selection step; and implements a prediction model comprising a neural network trained on landing data originating from previous landings;

a transmission unit configured to transmit said value of the time of occupancy of the runway; and a user system configured to receive the transmission from the transmission unit and to execute an avoidance task on at least one of the aircraft or a subsequent aircraft when the time of occupancy of the runway exceeds the threshold.

12. The system as claimed in claim 11, wherein the selection unit corresponds to at least one human-machine interfaces from: a human-machine interface of an electronic flight bag; and a human-machine interface of a flight management system of the aircraft.

13. The system as claimed in claim 11, wherein the avionics computer forms part of a flight management system, or part of an air traffic service unit.

14. An aircraft comprising:

the system of claim 11.

15. The system as claimed in claim 11, wherein the avoidance task is selected from at least one of the following:

a go-around procedure;

a hold short;

a reduction or increase of airspeed; or a heading or altitude change.

16. The system as claimed in claim 11, wherein the computing of the value of the time of occupancy of the runway is based on a sum of an approach time and a taxi time.

17. The system as claimed in claim 16, wherein the approach time is determined based on a flight time of the aircraft when the aircraft passes over a runway threshold at a height of 15 meters above the ground to when wheels of the aircraft make contact with the ground.

18. The system as claimed in claim 16, wherein the taxi time is determined based on a time taken by the aircraft when wheels of the aircraft make contact with the ground to when the aircraft exits the runway.

* * * * *